United States Patent
Wolcott et al.

(10) Patent No.: US 11,044,656 B2
(45) Date of Patent: Jun. 22, 2021

(54) SYSTEMS AND METHODS FOR CALL MANAGEMENT

(71) Applicant: Comcast Cable Communications, LLC, Philadelphia, PA (US)

(72) Inventors: Larry Wolcott, Denver, CO (US); Robert Gonsalves, Arvada, CO (US); Thomas Bach, Lone Tree, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 84 days.

(21) Appl. No.: 16/153,505

(22) Filed: Oct. 5, 2018

(65) Prior Publication Data

US 2020/0112903 A1     Apr. 9, 2020

(51) Int. Cl.
| | |
|---|---|
| H04W 36/30 | (2009.01) |
| H04W 36/08 | (2009.01) |
| H04W 40/12 | (2009.01) |
| H04W 36/38 | (2009.01) |
| H04W 40/24 | (2009.01) |
| H04W 40/36 | (2009.01) |

(52) U.S. Cl.
CPC ........... *H04W 36/30* (2013.01); *H04W 36/08* (2013.01); *H04W 36/385* (2013.01); *H04W 40/12* (2013.01); *H04W 40/246* (2013.01); *H04W 40/36* (2013.01)

(58) Field of Classification Search
CPC ... H04W 36/30; H04W 36/08; H04W 36/385; H04W 40/12; H04W 40/36; H04W 40/246
See application file for complete search history.

(56) References Cited

U.S. PATENT DOCUMENTS

| | | | |
|---|---|---|---|
| 6,804,532 B1 | 10/2004 | Moon et al. | |
| 7,570,618 B2 * | 8/2009 | Son | H04W 36/26 370/331 |
| 8,416,697 B2 | 4/2013 | Wolcott et al. | |
| 9,015,786 B2 | 4/2015 | Wolcott et al. | |
| 9,065,554 B2 | 6/2015 | Wolcott et al. | |
| 9,380,475 B2 | 6/2016 | Wolcott et al. | |
| 9,444,719 B2 | 9/2016 | Wolcott et al. | |
| 9,622,124 B2 * | 4/2017 | Hamilton | H04W 36/0083 |
| 2003/0003912 A1 * | 1/2003 | Melpignano | H04W 36/0055 455/436 |
| 2006/0159100 A1 * | 7/2006 | Droms | H04L 12/2801 370/395.2 |
| 2007/0263575 A1 * | 11/2007 | Choe | H04W 36/0066 370/338 |
| 2012/0128045 A1 * | 5/2012 | Ling | H04L 12/2801 375/222 |

(Continued)

FOREIGN PATENT DOCUMENTS

EP     2966901 A1     1/2016

*Primary Examiner* — Rasheed Gidado
(74) *Attorney, Agent, or Firm* — BakerHostetler

(57) ABSTRACT

Systems and methods are described for call management. A method may comprise determining at least a portion of a network topology. A handoff parameter may be determined based on one or more of network telemetry information or reliability information associated with the network topology. A handoff may be caused, based on at least the handoff parameter, between a first network device and a second network device associated with the network topology.

21 Claims, 8 Drawing Sheets

(56) References Cited

U.S. PATENT DOCUMENTS

| | | | |
|---|---|---|---|
| 2012/0178493 A1* | 7/2012 | Marquez | H04W 52/40 455/522 |
| 2014/0155071 A1* | 6/2014 | M | H04W 36/08 455/438 |
| 2014/0204794 A1* | 7/2014 | El-Najjar | H04L 41/145 370/254 |
| 2015/0024774 A1* | 1/2015 | Ostergaard | H04L 41/12 455/456.1 |
| 2017/0041776 A1* | 2/2017 | Faccin | H04W 76/15 |
| 2019/0037468 A1* | 1/2019 | Bongaarts | H04W 36/32 |
| 2019/0159097 A1* | 5/2019 | Tang | H04W 36/00 |

* cited by examiner

SYSTEMS AND METHODS FOR CALL MANAGEMENT

BACKGROUND

A service network may provide multiple services, such as a voice services (e.g., telephone, etc.), video services (e.g., television, etc.) and data services (e.g., Internet, etc.). Expectations of users of the services may be different for the various services. While a user may find it acceptable to wait for a webpage to load, both a call recipient and a caller will probably not tolerate delays in voice service during a call. Therefore, there is a need to proactively manage calls to avoid delays as issues with a content provider's network arise.

SUMMARY

Systems and methods are described for proactive call management. A method may comprise determining at least a portion of a network topology. A device such as a call management device may use the network topology to determine whether transmission quality of the call may be improved by connecting a user device to a different network device in the network topology. A handoff parameter may be used to determine whether connecting with the different network device may improve transmission quality. The handoff parameter may be determined by combining network information associated with a service network with wireless network information of one or more access points of a wireless network. Other parameters and information may be used.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
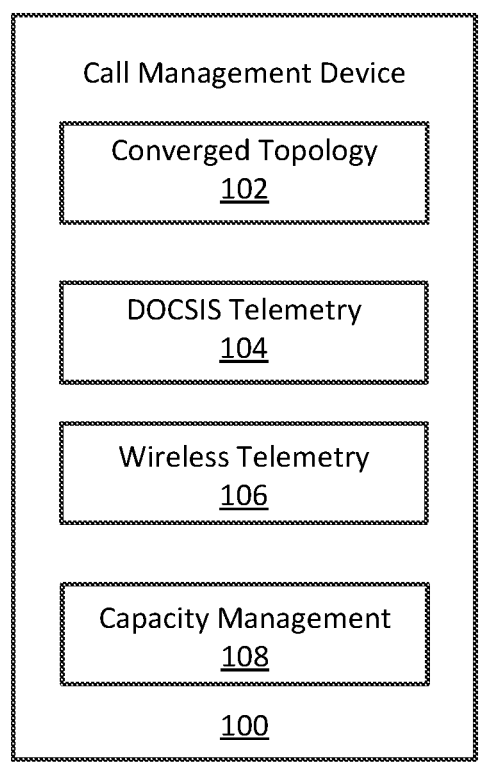
FIG. 1 is a block diagram of an example call management device.

Systems and methods are described for call management, such as proactive call management. The call management may be implemented using a call management device (e.g., proactive call controller). The call management device may be or comprise a converged call control plane. The call management device may have knowledge of a network such as access to information associated with network topology and network traffic. The call management device may have knowledge of hybrid fiber-coax (HFC) network topology, cellular towers, radio heads, and Wi-Fi access points (e.g., hot spots, routers, etc.). Data Over Cable Service Interface Specification (DOCSIS) network maintenance (e.g., proactive network maintenance (PNM)) may provide unique localization to cable specific problems, such as radio frequency (RF) noise on coaxial cable. RF noise may cause latency and/or jitter, which may be problematic for real-time services that demand high reliability and high availability, such as voice calls and gaming.

Network controlled handoffs/handovers may be influenced by DOCSIS PNM to proactively steer mobile units to a best network connection. The call management device may use one or more tools associated with DOCSIS network maintenance to determine that a problem exists on a link hosting a current voice call. The DOCSIS network maintenance information may traditionally be used for other network diagnostic purposes, but the present disclosure improves upon conventional usage of the network information to be used for other services, such as wireless telephony services. This usage allows for more complex handoff of communication sessions between different types of network architecture, such as cellular service, Wi-Fi networks, and the like.

The call management device may retrieve a neighbor list. The neighbor list may comprise a list of devices with which a mobile device making a call may connect (e.g., cellular towers, radio heads, Wi-Fi access points, etc.). The mobile device may be attached to (e.g., connected to, paired with, etc.) a network access point. The neighbor list may comprise devices neighbors of (e.g., close to, near, adjacent to, etc.) the network access point. The neighbor list may be based on a location of the mobile device and/or a location of the network access point. The neighbor list may comprise 4G topology, 5G topology, Wi-Fi topology, the like, and/or any combination of the foregoing. The usage of a neighbor list to include devices from diverse types of network technologies allows for more complex handoff between more diverse networks. The call management device may consider traditional wireless telemetry weighted by DOCSIS telemetry (e.g., DOCSIS PNM telemetry) to account for reliability. Including DOCSIS telemetry detected errors may proactively bias handoffs to one or more most robust physical layer (PHY) connected radios. An example formula for expressing the "handoff weight" each neighbor is assigned may be:

$$HO^n = \frac{(s+l)}{pr} * \frac{u}{1},$$

where HO=Handoff Weight, n=the number of handoff points, u=utilization, l=latency, s=signal (e.g., signal strength), and pr=DOCSIS network reliability (e.g., DOCSIS PMN reliability). The utilization, latency, and signal may be wireless telemetry information that is specific to the network device or neighbor for which the handoff weight is determined. Identification of problems within a HFC topology, such as fault detection and localizations, may be used to measure network performance for a portion of a network. Known call problem identification techniques may allow for identification of the problem within the transport layer with fine-grained location detail.

Example techniques for identifying problems within a HFC topology are shown in U.S. Pat. No. 9,380,475, titled "Network Implementation of Spectrum Analysis," herein incorporated by reference in its entirety. Example techniques for identifying problems within a HFC topology are also shown in U.S. Pat. No. 9,444,719, titled "Remote Detection and Measurement of Data Signal Leakage," herein incorporated by reference in its entirety. Example techniques for identifying problems within a HFC topology are also shown in U.S. Pat. No. 8,416,697, titled "Identification of a Fault," herein incorporated by reference in its entirety. Example techniques for identifying problems within a HFC topology are also shown in U.S. Pat. No. 9,065,554, titled "System and Method for Analyzing a Network," herein incorporated by reference in its entirety. Example techniques for identifying problems within a HFC topology are also shown in U.S. Pat. No. 9,015,786, titled "Noise Ingress Detection," herein incorporated by reference in its entirety.

The fine-grained fault location detection described herein may offer a unique way to address a sparsity problem with 5G radio head topology. Complex handoff algorithms may be influenced to proactively improve a call experience. The fine-grained fault location detection may be especially valuable in a highly distributed remote PHY (R-PHY) HFC architecture.

Once the call management device determines that a call should be handed off, existing mobile handoffs protocols may be used. Any or all of network-controlled handoff (NCHO), mobile-assisted handoff (MAHO), soft handoff (SHO), and mobile-controlled handoff (MCHO) may be used.

FIG. 1 shows a block diagram of an example call management device 100 (e.g., call controller). The call management device 100 may comprise converged topology information 102. Converged topology information 102 may comprise knowledge about hybrid fiber-coax (HFC) network topology, cellular towers, radio heads, and Wi-Fi access points (e.g., hot spots, routers, etc.). The call management device 100 may comprise Data Over Cable Service Interface Specification (DOCSIS) telemetry information 104, such as proactive network maintenance (PNM) telemetry information. It should be understood that the term DOCSIS telemetry information is used as an example, and the disclosure contemplates that the DOCSIS telemetry information may be a more general network telemetry information associated with any type of network. The term proactive network maintenance may refer to a process of monitoring telemetry information throughout a network to determine changes (e.g., trends) of conditions of a network. The monitoring may be performed directly on a device or by using data from other devices, such as neighboring devices, to determine specific network conditions. Proactive network maintenance may be used to identify timing information (e.g., times of network conditions), location information (e.g., location in network topology), weather information, and/or the like associated with network problems. Certain network conditions may be due to recurring interference, weather, traffic, bottlenecks and/or other conditions. Any of this type of information may be included as part of the DOCSIS telemetry information. The DOCSIS telemetry information 104 may comprise cable specific information, such as radio frequency (RF) noise on coaxial cable, microreflections (e.g., in excess of an expected amount), phase noise, and group delay variation, and/or a combination thereof. The call management device 100 may comprise wireless telemetry information 106. The wireless telemetry information 106 may comprise capacity, utilization, latency, signal strength, multipath interference, the like, and/or any combination of the foregoing. The call management device 100 may comprise capacity management information 108. Capacity management information 108 may comprise traffic shaping information, load balancing information, etc.

A user (e.g., subscriber, consumer) may initiate a voice call using a mobile device via a content provider's voice over internet protocol (VoIP) service. The user may subscribe to the VoIP service. The mobile device may access a network associated with the content provider using an access point. The access point may be a cellular tower, a radio head, or a Wi-Fi access point. The call management device 100 may monitor the network. The call management device 100 may receive the wireless telemetry information 106 associated with the access point, as well as the wireless telemetry information 106 associated with the access point's neighbors. The call management device 100 may use converged topology information 102 to determine which portions of the network will be used if the mobile device continues the call from the access point and which portions of the network will be used if the mobile device continues the call from each of the neighbors. The call management device 100 may receive the DOCSIS telemetry information, such as DOCSIS PNM telemetry information 104 for each of the determined portions of the network. The call management device 100 may check the DOCSIS telemetry information 104 to see if any of the determined portions of the network are experiencing issues. The DOCSIS telemetry information 104 may comprise telemetry information for a plurality of devices. The DOCSIS telemetry information 104 may comprise a corresponding location (e.g., or region or portion of the network) for one or more of the plurality of devices. In some implementations, the call management device 100 may determine and/or associate location information with the DOCSIS telemetry information 104. If the DOCSIS telemetry information 104 indicates a particular network device (e.g., optical node, amplifier, splitter, router, multiplexer, modem), the call management device 100 may determine a data indicative of a location (e.g., region, topology location) of the network device. The call management device 100 may determine the data indicative of the location based on network topology data. The network topology data may comprise an association of the network device (e.g., an identifier of the network device) and corresponding location data (e.g., topology data). The corresponding location data may comprise data indicating neighboring network devices (e.g., a list of neighboring devices, a graph of network devices), a topology region, topology levels (e.g., levels may indicate hierarchy, hops, and/or distance from a central location), geolocation data, and/or the like. The call management device 100 may associate the location data from the network topology data and specific telemetry information received from the network device.

The call management device 100 may use capacity management information 108 to assess (e.g., estimate, calculate, guess, etc.) how moving the call to each of the access point's neighbors would affect traffic. The call management device 100 may determine to continue the call at the current access point or to cause the call to be handed off to one of the access point's neighbors.

Figure 2:
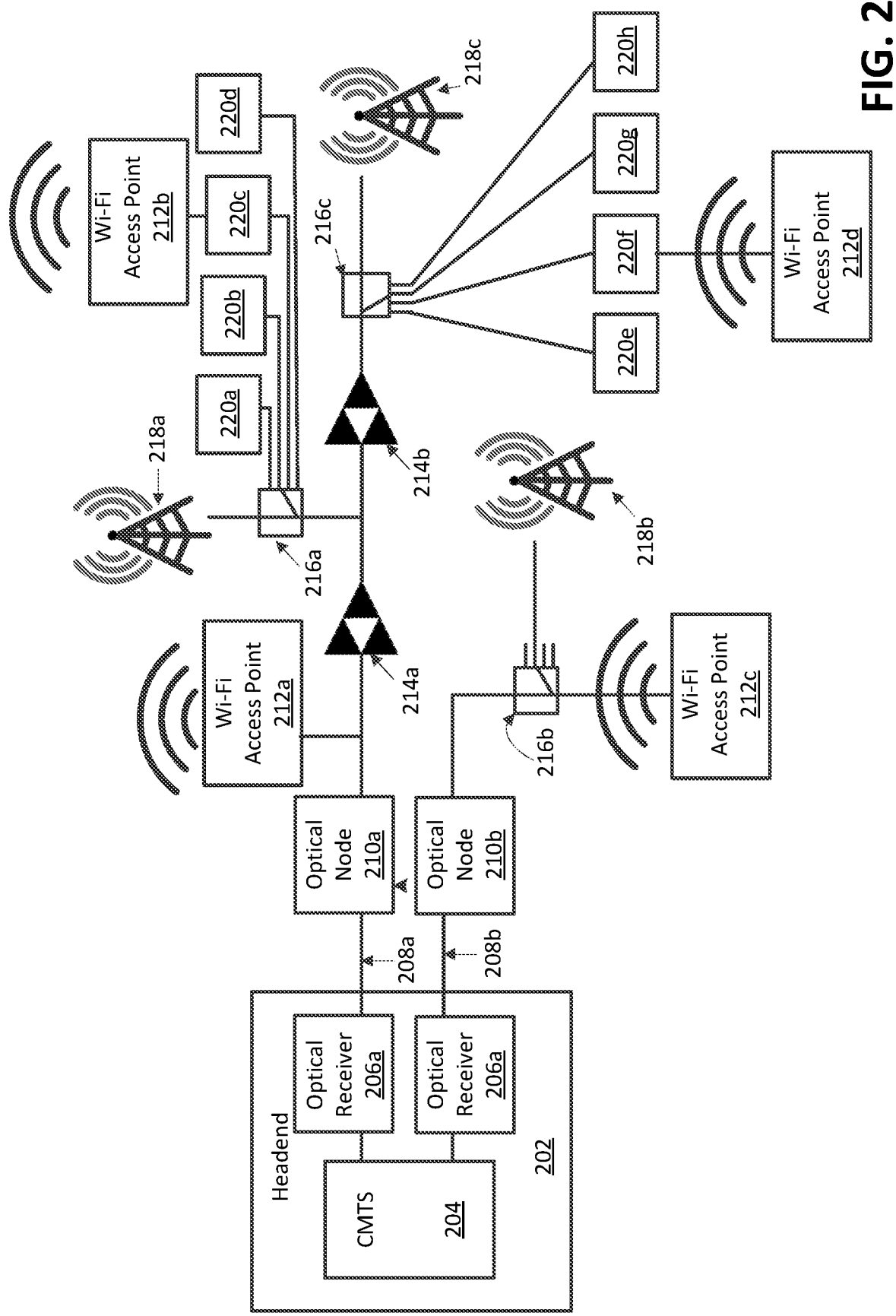
FIG. 2 is an example monitored convergent network.

FIG. 2 shows an example monitored convergent network. The call management device 100 of FIG. 1 may monitor the convergent network of FIG. 2. The network may comprise one or more computing devices such as a headend 202, one or more optical links 208a, 208b, one or more optical nodes 210a, 210b, one or more Wi-Fi access points 212a, 212b, 212c, 212d, one or more amplifiers 214a, 214b, one or more switches (e.g., switches and/or routers) 216a, 216b, 216c, one or more cellular towers 218a, 218b, 218c, and one or more premises 220a, 220b, 220c, 220d, 220e, 220f, 220g, 220h. The headend 202 may comprise a cable modem termination system (CMTS) 204 and one or more optical receivers 206a, 206b. Although other computing devices may be used. The headend 202 may be the control center for an entity (e.g., content provider). The CMTS 204 may be used to provide Internet access and/or voice over Internet Protocol (VoIP) over a cable network. The optical receivers 206a, 206b may act as an interface between the CMTS 204 and the optical links 208a, 208b. The optical links 208a, 208b may transfer optical signals between the optical receivers 206a, 206b, and the optical nodes 210a, 210b. The optical nodes 210a, 210b may act as an interface between the optical links 208a, 208b and the rest of the network.

The network may comprise amplifiers 214a, 214b for increasing the power of a signal as the signal travels throughout a network. The network may comprise switches 216a, 216b, 216c for directing (e.g., routing, etc.) traffic. The network may comprise a premises 220a, 220b, 220c, 220d, 220e, 220f, 220g, 220h of users (e.g., subscribers of the content provider). The premises 220c, 220f may comprise Wi-Fi access points 212b, 212d. The network may comprise access points (e.g., Wi-Fi access point 212a, Wi-Fi access point 212c, cellular tower 218a, cellular tower 218b, cellular tower 218c, a radio head (not shown), etc.).

A call may be initiated on a user's mobile device. The mobile device may access the network at an access point (e.g., a Wi-Fi access point 212a, 212b, 212c, 212d, a cellular tower 218a, 218b, 218c, a radio head (not shown), etc.). A link associated with the call may be established from the access point, through the network, to the device being called (call receiver). The link may comprise various parts of the network, such as the switches 216a, 216b, 216c, the amplifiers 214a, 214b, the optical nodes 210a, 210b, the optical receivers 206a, 206b, and the CMTS 204. The call management device 100 may monitor the network.

The mobile device may be attached to (e.g., connected to, paired with, etc.) the Wi-Fi access point 212d. The call management device 100 may sense (e.g., detect, determine, etc.) a problem with the network near the amplifier 214b. Telemetry information associated with the amplifier 214b, a physical link, a device near (e.g., connected to, within a region) the amplifier 216 may be used to sense the problem with the network. Network topology data may be used to determine a location of the amplifier 214. The location may be used to determine a portion of the network to analyze for the network problem. The call management device 100 may determine that voice traffic from the Wi-Fi access point 212d is affected by the problem with the network near the amplifier 214b. The call management device 100 may determine that the cellular tower 218b is a neighbor of the Wi-Fi access point 212d. The call management device 100 may also determine that traffic associated with the cellular tower 218b is unaffected by the problem near the amplifier 214b. The call management device 100 may cause the call associated with the mobile device to be transferred (e.g., handed off, etc.) from the Wi-Fi access point 212d to the cellular tower 218b.

Figure 3:
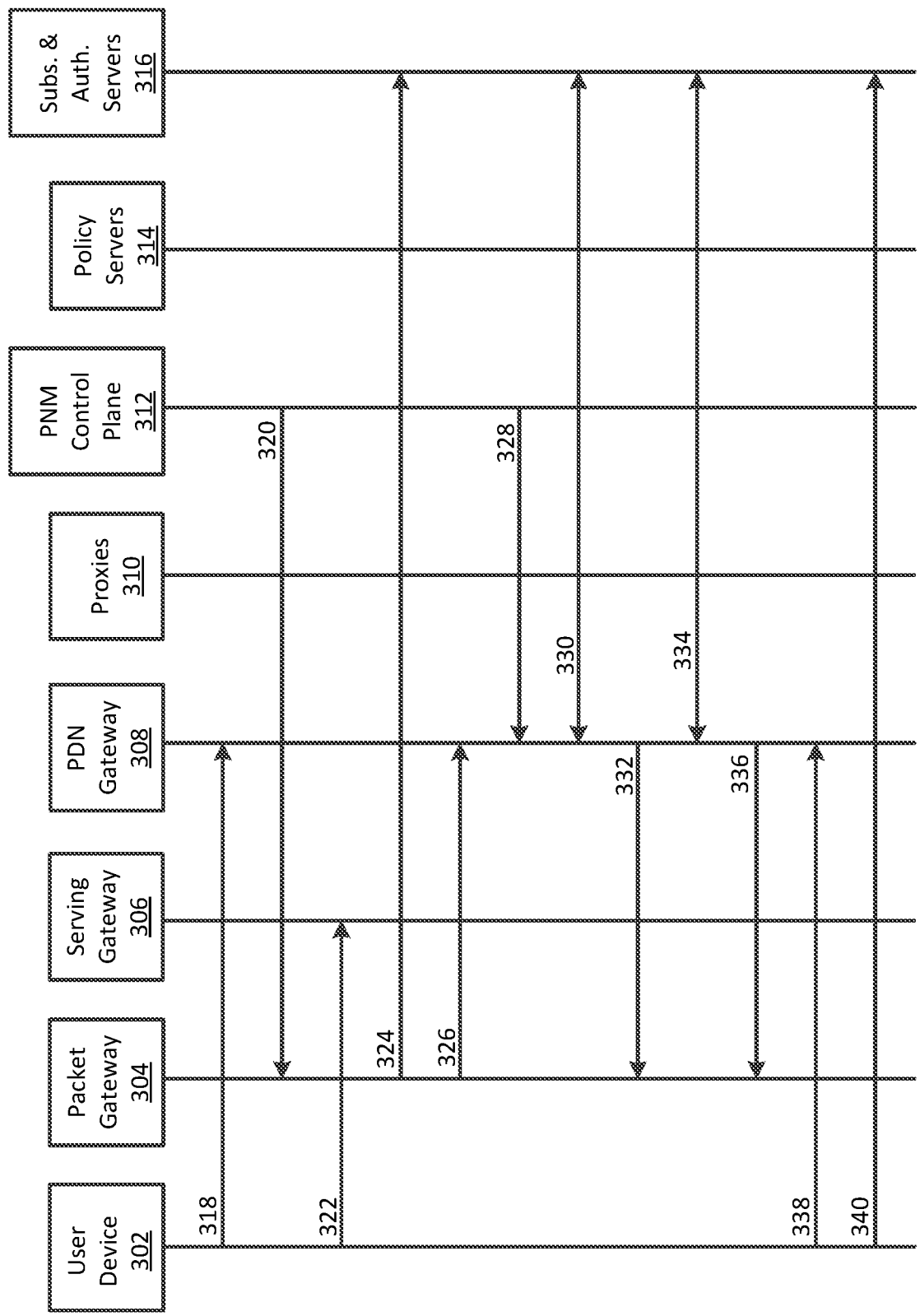
FIG. 3 is a sequence diagram of an example data flow.

FIG. 3 shows an example sequence diagram of an example data flow. The sequence diagram comprises a user device 302, a packet gateway 304, a serving gateway 306, a packet data network (PDN) gateway 308, proxies 310, a proactive network maintenance (PNM) control plane 312 (or the call management device 100 of FIG. 1), policy servers 314, and subscription and authorization servers 316. At 318, a voice over long term evolution (VoLTE) call may already be established via one or more general packet radio service (GPRS) tunneling protocol (GTP) tunnels from the user device 302 to the PDN gateway 308. At 320, the PNM control plane 312 may invoke a network initiated handoff request to DOCSIS connected Wi-Fi at the packet gateway 304. At 322, the user device 302 may establish one or more tunnels with the packet gateway 304. At 324, the packet gateway 304 may cause one or more of the subscription and authorization servers 316 to provide authorization. Although not shown, the packet gateway 304 may cause one or more of the policy servers 314 to provide authorization. At 326, the packet gateway 304 may create a session request with the PDN gateway 308. At 328, the PNM control plane 312 may provide a topology for an optimized handoff to the PDN gateway 308. At 330, an existing session between the PDN gateway 308 and the subscription and authorization servers 316 may be modified. At 332, the PDN gateway 308 may provide a session response to the packet gateway 304. At 334, the PDN gateway 308 may update the subscription and authorization servers 316. Although not shown, the PDN gateway 308 may update the policy servers 314. At 336, the PDN gateway 308 may update an internet protocol (IP) address associated with the current call at the packet gateway 304. Although not shown, the IP addresses associated with the current call at the proxies 310 may also be updated. At 338, the user device 302 may establish a new tunnel with the PDN gateway 308. At 340, the user device 302 may request authorization from the subscription and authorization servers 316.

Figure 4:
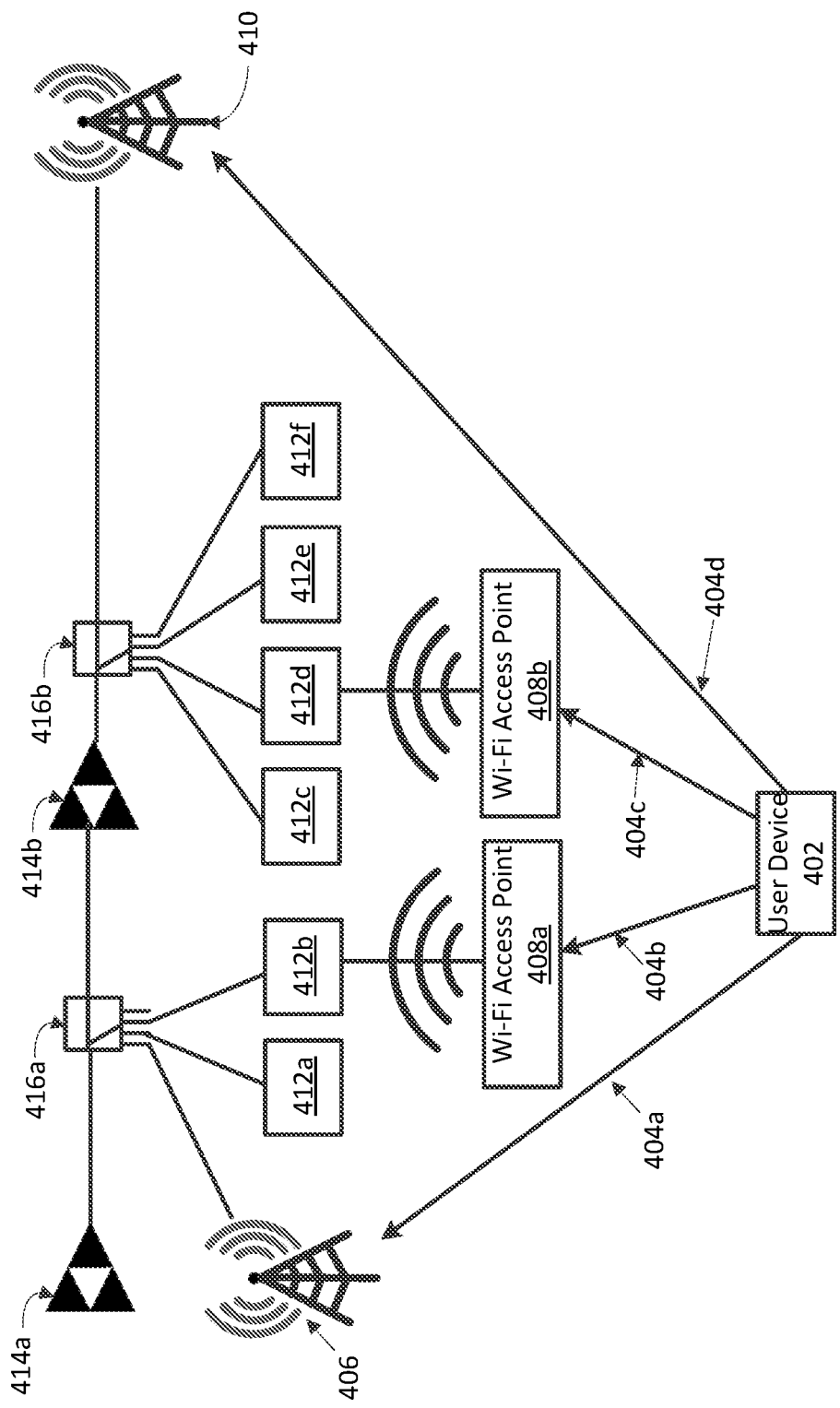
FIG. 4 is an example system environment.

FIG. 4 shows an example system environment. A user device 402 may be within range of a 5G radio head 406, a first Wi-Fi access point 408a, a second Wi-Fi access point 408b, and a cellular tower 410. The 5G radio head 406 receives a signal 404a from the user device 402 to determine a signal strength associated with the user device 402. The first Wi-Fi access point 408a receives a signal 404b from the user device 402 to determine a signal strength associated with the user device 402. The second Wi-Fi access point 408b receives a signal 404c from the user device 402 to determine a signal strength associated with the user device 402. The cellular tower 410 receives a signal 404d from the user device 402 to determine a signal strength associated with the user device 402.

The first Wi-Fi access point 408a may be associated with a first premises 412b. The second Wi-Fi access point 408b may be associated with a second premises 412d. The first premises 412b may be in communication with a first switch 416a. The second premises 412d may be in communication with a second switch 416b. The first switch 416a may be in communication with the radio head 416. The first switch 416a may be in communication with another premises 412a. The second switch 416b may be in communication with the cellular tower 410. The second switch 416b may be in communication with other premises 412c, 412e, 412f. The network may comprise a first amplifier 414a at a location between a CMTS (not shown) and the first switch 416a. The first amplifier 414a may also be at a location in the network between the CMTS and the second switch 416b. The network may comprise a second amplifier 414b at a location between the CMTS and the second switch 416b.

The user device 402 may initiate a call via the second Wi-Fi access point 408b. The call management device 100 in FIG. 1 may detect (e.g., sense, determine, etc.) an ingress/egress fault at the output of the second amplifier 414b. The call management device 100 may detect the ingress/egress fault using DOCSIS telemetry information 104, such as DOCSIS PNM telemetry information 104. The call management device 100 may steer the user device 402 to the 5G radio head 406 or the first Wi-Fi access point 408a and away from the second Wi-Fi access point 408b and the cellular tower 410. The call management device 100 may cause the call to be handed off from the second Wi-Fi access point 408b to either the 5G radio head 406 or the first Wi-Fi access point 408a. Which one of the 5G radio head 406 and the first Wi-Fi access point 408a is selected for the hand off may depend on other network conditions, such as wireless telemetry information 106 and/or capacity management information 108.

Figure 5:
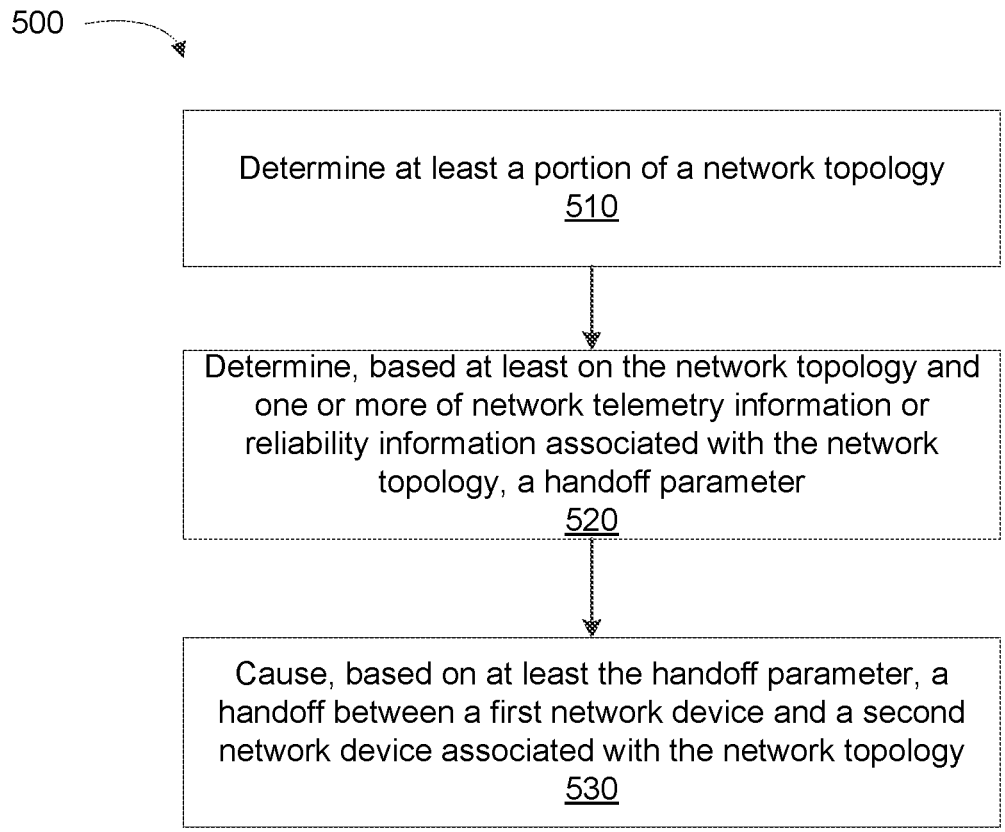
FIG. 5 is a flow diagram of an example method.

FIG. 5 shows a flow diagram of an example method. At step 510, at least a portion of a network topology may be determined by a call management device (e.g., call controller). The call management device 100 in FIG. 1 may determine at least a portion of a network topology. The network topology may be associated with one or more converged networks comprising physically connected device and wirelessly connected devices. The network topology may be associated with one or more hybrid fiber-coax networks. The network topology may be associated with one or more wireless networks. The determining the at least a portion of the network topology may be based on one or more neighbor lists. The determining the at least a portion of the network topology may comprise receiving one or more neighbor lists. The one or more neighbor lists may comprise a list of devices with which a mobile device making a call may connect, a list of devices that are neighbors (e.g., close to, near, adjacent to, etc.) with each other, a list of devices that are neighbors of a location and/or device.

At step 520, a handoff parameter may be determined. The handoff parameter may be indicative of and/or characterize a state (e.g., condition, network condition) of one or more network devices associated with the network topology. The handoff parameter may be indicative of an expected (e.g., or estimated) transmission quality, communication quality, call quality (e.g., if the device is used to transmit data associated with the call), and/or the like. The handoff parameter may comprise the handoff weight as described herein.

The handoff parameter may be determined based at least on the network topology and one or more of network telemetry information or reliability information associated with the network topology. The call management device 100 in FIG. 1 may determine a handoff parameter based at least on the network topology and one or more of network telemetry information or reliability information associated with the network topology. The determining the handoff parameter may be based on at least Data Over Cable Service Interface Specification (DOCSIS) telemetry information, such as proactive network maintenance (PNM) telemetry information. The determining the handoff parameter may be based on the reliability information. The reliability information may comprise network capacity information. The determining the handoff parameter may be based on the reliability information. The reliability information may comprise error detection information. The determining the handoff parameter may be based on the reliability information. The reliability information may comprise network utilization information. The determining the handoff parameter may be based on the reliability information. The reliability information may comprise network latency information. Wireless telemetry information (e.g., associated with a particular wireless access point) may be weighted by DOCSIS telemetry information (e.g., associated with a portion of the network, used for analyzing a service network (e.g., content network, cable access and/or delivery network) to determine the handoff parameter. For example, the wireless telemetry information may comprise utilization, latency, signal strength, and/or the associated with a wireless access point. The DOCISS telemetry information may be collected as part of a different service (e.g., premises network service, content delivery service) than a wireless communication service (e.g., cell phone service).

The handoff parameter may be indicative of and/or characterize a state (e.g., condition, network condition) of one or more devices. The handoff parameter may be indicative of an expected (e.g., or estimated) call quality (e.g., if the device is used to transmit data associated with the call). The handoff parameter may comprise the handoff weight as described herein. The handoff parameter may be determined for a first network device, a second network device, and/or other devices. The first network device may be listed on at least one of the one or more neighbor lists. The first network device may be listed on at least one of the one or more neighbor lists. The handoff parameter may be determined for each of the devices on the one more neighbor lists.

At step 530, a handoff between a first network device and a second network device may be caused based on at least the handoff parameter. The first network device and/or the second network device may be associated with the network topology. The call management device 100 in FIG. 1 may cause a handoff between the first network device and the second network device based on at least the handoff parameter. One of the first network device and the second network device may be a physically-connected device and the other may be a wirelessly-connected device.

One or more handoff parameters may be compared (e.g., ranked) to determine a network device that will provide the best (e.g., or better, improved) conditions, state, transmission quality, and/or the like. Comparison of a handoff parameter (e.g., the determined handoff parameter of step 520) associated with the second network device to a handoff parameter associated with the first network device may indicate that the second network device is likely to provide a better condition, state, transmission quality, and/or the like than the first device. The handoff parameter associated with the second network device may be higher (e.g., or lower) than the handoff parameter associated with the first network device (e.g., or any other network device on the one or more neighbor lists). The handoff may be caused based on the comparison of the one or more handoff parameters. The handoff may be caused based on the handoff parameter associated with the second network device being higher (e.g., or lower) than the handoff parameter associated with the first network device (e.g., or any other network device on the one or more neighbor lists).

A user, such as a subscriber of a content provider, may initiate a voice call. The content provider may facilitate the call by using components of a network to create a temporary link between a device associated with the user and a device being called. A call management device (e.g., call controller) may determine an issue (e.g., a performance condition, a network condition) associated with a portion of the link. The call management device may examine network topology and telemetry to determine a second link that is determined to be better (e.g., have better network conditions) than the first link. The call management device may cause the second link between the user device and the called device to be established. The call may cease to be routed through the initial link and may be routed through the second link.

Figure 6:
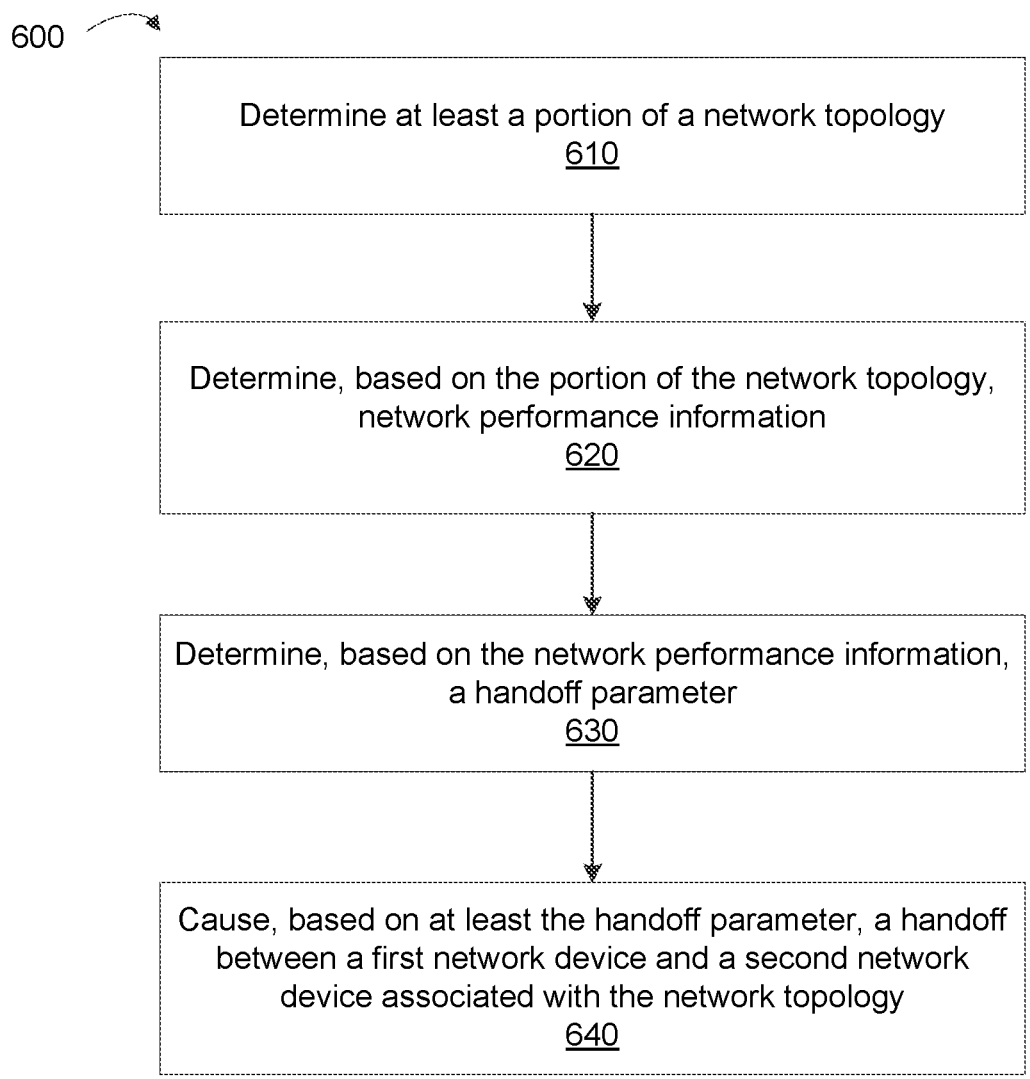
FIG. 6 is a flow diagram of an example method.

FIG. 6 shows a flow diagram of an example method. At step 610, at least a portion of a network topology may be determined by a call management device (e.g., call controller). The call management device 100 in FIG. 1 may determine at least a portion of a network topology. The network topology may be associated with one or more converged networks comprising physically connected device and wirelessly connected devices. The network topology may be associated with one or more hybrid fiber-coax networks. The network topology may be associated with one or more wireless networks. The determining the at least a portion of the network topology may be based on one or more neighbor lists. The determining the at least a portion of the network topology may comprise receiving one or more neighbor lists. The one or more neighbor lists may comprise a list of devices with which a mobile device making a call may connect, a list of devices that are neighbors (e.g., close to, near, adjacent to, etc.) with each other, a list of devices that are neighbors of a location and/or device.

At step 620, network performance information may be determined. The network performance information may be determined based on the portion of the network topology. The network performance information may be indicative of network performance of one or more network devices associated with the portion of the network topology. The portion of the network topology may be used to determine a set of devices (e.g., devices on a neighbor list), network links, network conditions and/or the like associated with locations within a threshold proximity to a device of interest (e.g., a user device, a device that is handed off. The network performance information may be determined by determining performance information corresponding to the set of devices, network links, network conditions and/or the like associated with locations within the threshold proximity.

The network performance information may comprise proactive network maintenance (PNM) information. The call management device 100 in FIG. 1 may determine network performance information based at least on the network topology. The network performance information may comprise Data Over Cable Service Interface Specification (DOCSIS) telemetry information. The DOCSIS telemetry information may comprise DOCSIS proactive network maintenance information. The network performance information may comprise error detection information. The network performance information may comprise fault localization information. The network performance information may comprise the reliability information. The reliability information may comprise network capacity information. The reliability information may comprise error detection information. The reliability information may comprise network utilization information. The reliability information may comprise network latency information.

At step 630, a handoff parameter may be determined based on the network performance information. The handoff parameter may be determined based on the portion of the network topology. The network performance information may be determined (e.g., selected, limited, filtered) based on the network topology. The handoff parameter may be indicative of and/or characterize a state (e.g., condition, network condition) of one or more network devices associated with the network topology. The handoff parameter may be indicative of an expected (e.g., or estimated) transmission quality, communication quality, call quality (e.g., if the device is used to transmit data associated with the call), and/or the like. The handoff parameter may comprise the handoff weight as described herein.

The call management device 100 in FIG. 1 may determine the handoff parameter based on the network performance information. The determining the handoff parameter may be based on the capacity information, the reliability information, the network utilization information, the network latency information, a combination thereof, and/or the like. The handoff parameter may be based on a combination of DOCSIS telemetry (e.g., DOCSIS PNM telemetry) and wireless telemetry. Wireless telemetry information (e.g., associated with a particular wireless access point) may be weighted by DOCSIS telemetry (e.g., DOCSIS PNM telemetry) information (e.g., associated with a portion of the network, used for analyzing a service network, such as cable access and/or delivery network) to determine the handoff parameter. For example, the wireless telemetry information may comprise utilization, latency, signal strength, and/or the associated with a wireless access point. The DOCSIS telemetry (e.g., DOCSIS PNM telemetry) may be collected as part of a different service (e.g., a premises network service, a content delivery service) than a wireless communication service (e.g., a cell phone service).

At step 640, a handoff between a first network device and a second network device may be caused based on at least the handoff parameter. The first network device and/or the second network device may be associated with the network topology. The call management device 100 in FIG. 1 may cause a handoff between a first network device and a second network device based on at least the handoff parameter. One of the first network device and the second network device may be a physically-connected device and the other may be a wirelessly-connected device.

One or more handoff parameters may be compared (e.g., ranked) to determine a network device that will provide the best (e.g., or better, improved) conditions, state, transmission quality, and/or the like. Comparison of a handoff parameter (e.g., the determined handoff parameter of step 630) associated with the second network device to a handoff parameter associated with the first network device may indicate that the second network device is likely to provide a better condition, state, transmission quality, and/or the like than the first device. The handoff parameter associated with the second network device may be higher (e.g., or lower) than the handoff parameter associated with the first network device (e.g., or any other network device on the one or more neighbor lists). The handoff may be caused based on the comparison of the one or more handoff parameters. The handoff may be caused based on the handoff parameter associated with the second network device being higher (e.g., or lower) than the handoff parameter associated with the first network device (e.g., or any other network device on the one or more neighbor lists).

A user, such as a subscriber of a content provider, may initiate a voice call. The content provider may facilitate the call by using components of a network to create a temporary link between a user device initiating the call and a device being called. A call management device (e.g., call controller) may determine that the user device is connected to a first access point. The call management device may determine that a second access point and a cell tower are neighbors associated with the first access point. The call management device may determine that the second access point and the cell tower are neighbors of the first access point based on a neighbor list associated with the access point. The call management device may determine a handoff parameter for each of the first access point, the second access point, and the cell tower. The handoff parameters may be compared to determine that the second access point is likely to provide a better call quality than the first access point. The call management device may cause a second link between the user device and the called device to be established. The call management device may instruct the user device to connect to the second access point. The call may cease to be routed through the initial link and may be routed through the second link.

Figure 7:
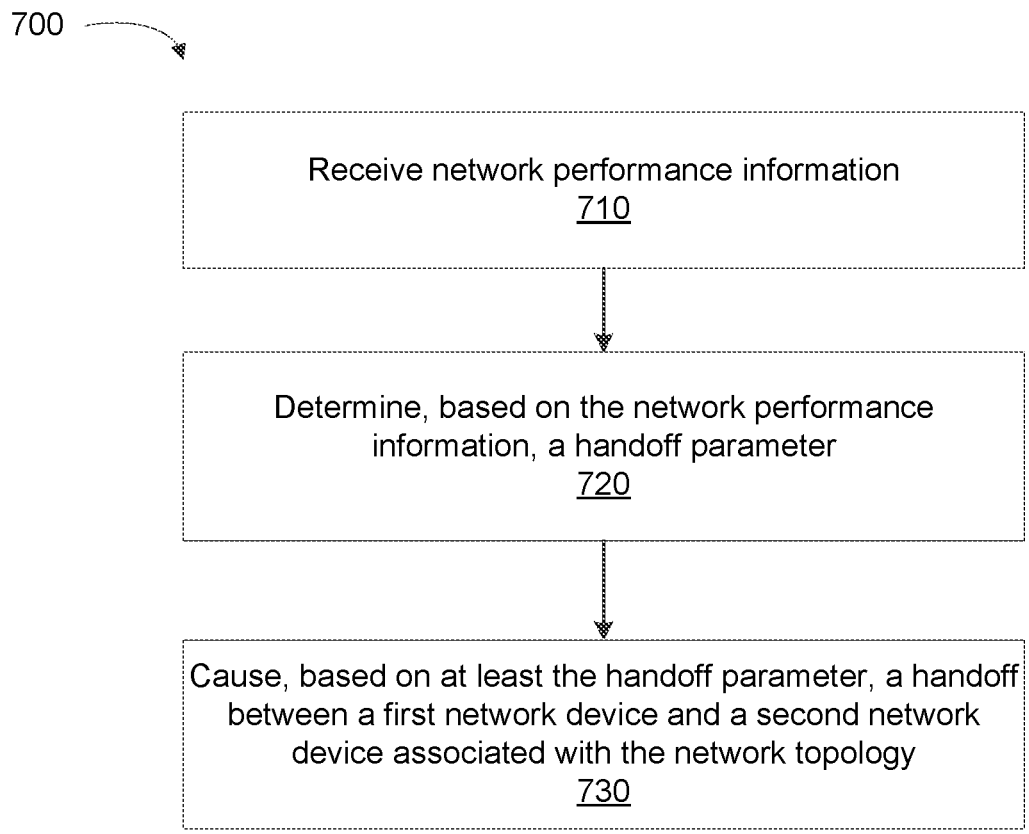
FIG. 7 is a flow diagram of an example method.

FIG. 7 is a flow diagram of an example method. At step 710, network performance information may be determined. The network performance information may be indicative of network performance of one or more network devices associated with a portion of a network topology. The network performance information may be associated with network maintenance, such as proactive network maintenance (PNM). A network maintenance process may determine telemetry information for a plurality of devices located in different portions of a network topology. The network maintenance process may determine one or more locations associated with error conditions, maintenance conditions, and/or the like. The error conditions and/or maintenance conditions may be associated with physical layer and/or link layer based conditions in a network. The network performance information may comprise and/or be associated with the location information. The network performance information may comprise telemetry information for a specific device (e.g., a first network device, a second network device). The telemetry information for the specific device may be associated with corresponding location information. The location information may comprise data indicating neighboring network devices (e.g., a list of neighboring devices, a graph of network devices), a topology region, topology levels (e.g., levels may indicate hierarchy, hops, and/or distance from a central location), geolocation data, and/or the like.

The network performance information may be received by a call management device (e.g., call controller). The call management device 100 in FIG. 1 may receive network performance information. The network topology may be associated with one or more converged networks comprising physically connected device and wirelessly connected devices. The network topology may be associated with one or more hybrid fiber-coax networks. The network topology may be associated with one or more wireless networks. The network performance information may comprise Data Over Cable Service Interface Specification (DOCSIS) telemetry information, such as PNM telemetry information. The network performance information may comprise error detection information. The network performance information may comprise fault localization information. The network performance information may comprise the reliability information. The reliability information may comprise network capacity information. The reliability information may comprise error detection information. The reliability information may comprise network utilization information. The reliability information may comprise network latency information.

At step 720, a handoff parameter may be determined based on the network performance information. The handoff parameter may be indicative of and/or characterize a state (e.g., condition, network condition) of one or more network devices associated with the network topology. The handoff parameter may be indicative of an expected (e.g., or estimated) transmission quality, communication quality, call quality (e.g., if the device is used to transmit data associated with the call), and/or the like. The handoff parameter may comprise the handoff weight as described herein. The call management device 100 in FIG. 1 may determine a handoff parameter based on the network performance information. The determining the handoff parameter may be based on the capacity information, the reliability information, the network utilization information, the network latency information, a combination thereof, and/or the like. The handoff parameter may be based on a combination of DOCSIS telemetry and wireless telemetry. Wireless telemetry information (e.g., associated with a particular wireless access point) may be weighted by DOCSIS telemetry information (e.g., associated with a portion of the network, used for analyzing a service network, such as a cable access and/or delivery network) to determine the handoff parameter. For example, the wireless telemetry information may comprise utilization, latency, signal strength, and/or the associated with a wireless access point.

At step 730, a handoff between a first network device and a second network device may be caused based on at least the handoff parameter. The first network device and/or the second network device may be associated with the network topology. The call management device 100 in FIG. 1 may cause a handoff between a first network device and a second network device based on at least the handoff parameter. One of the first network device and the second network device may be a physically-connected device and the other may be a wirelessly-connected device.

One or more handoff parameters may be compared (e.g., ranked) to determine a network device that will provide the best (e.g., or better, improved) conditions, state, transmission quality, and/or the like. Comparison of a handoff parameter (e.g., the determined handoff parameter of step 720) associated with the second network device to a handoff parameter associated with the first network device may indicate that the second network device is likely to provide a better condition, state, transmission quality, and/or the like than the first device. The handoff parameter associated with the second network device may be higher (e.g., or lower) than the handoff parameter associated with the first network device (e.g., or any other network device on the one or more neighbor lists). The handoff may be caused based on the comparison of the one or more handoff parameters. The handoff may be caused based on the handoff parameter associated with the second network device being higher (e.g., or lower) than the handoff parameter associated with the first network device (e.g., or any other network device on the one or more neighbor lists).

A user, such as a subscriber of a content provider, may initiate a voice call. The content provider may facilitate the call by using components of a network to create a temporary link between a user device initiating the call and a device being called. A call management device (e.g., call controller) may determine an issue associated with a portion of the link. The link may comprise a cellular access point, such as a 5G access point (e.g., on a cell tower). The call management device may determine that the user device leaving the range of the cellular access point. The user device may be moving towards an area that is not covered by cellular service. The call management device may examine network topology and telemetry to determine a second, more reliable link. The call management device may determine one or more wireless access points associated with a service network (e.g., a content network, a DOCSIS network, a cable access and/or delivery network) located near the cellular access point. Handoff parameters may be determined for each of the one or more wireless access points. A wireless access point may be determined for handling the call based on a comparison of the one or more wireless access points. The call management device may cause a second link, via the determined wireless access point, between the user device and the called device to be established. The call may cease to be routed through the initial link and may be routed through the second link.

Figure 8:
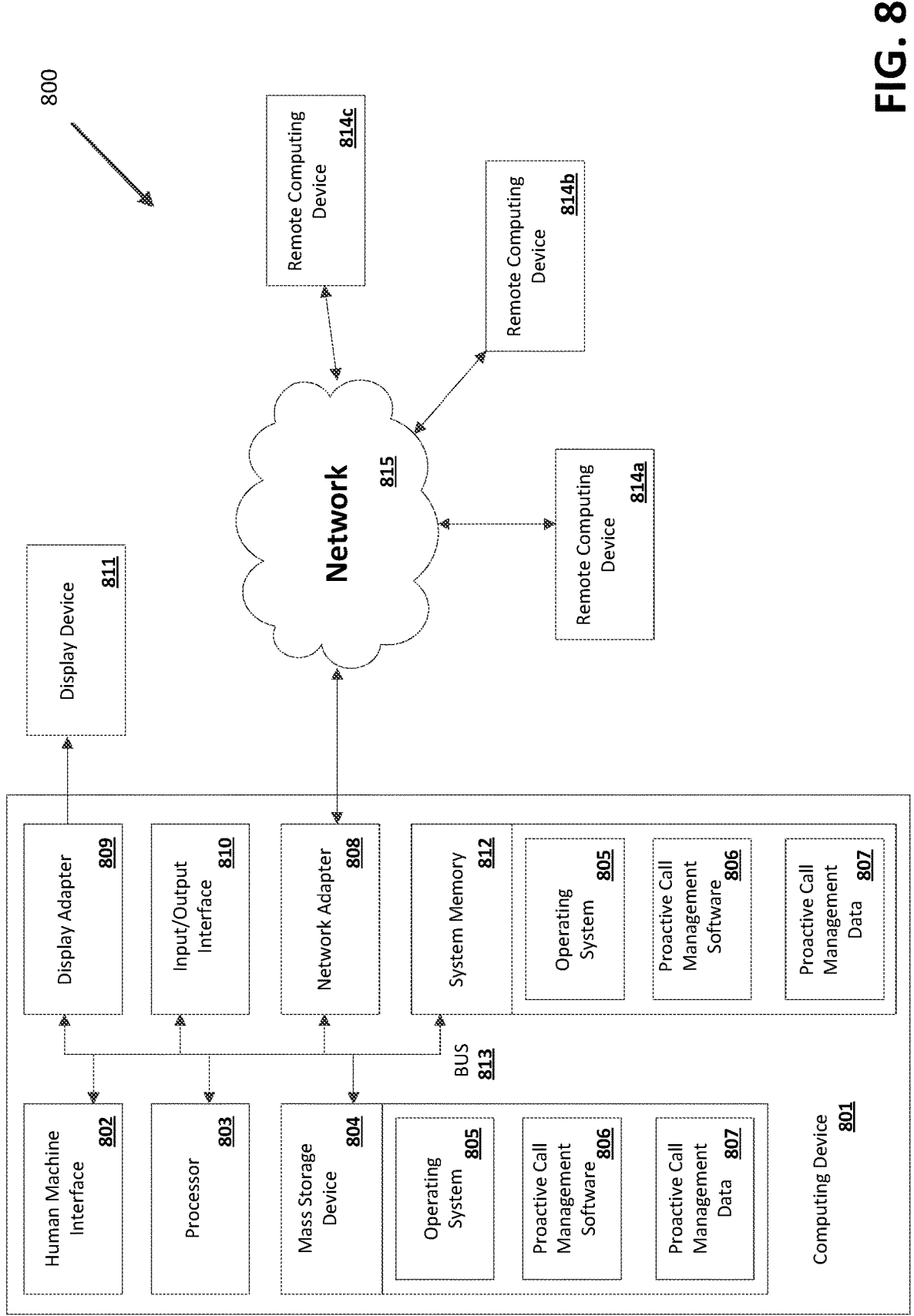
FIG. 8 is a block diagram of an example operating environment.

FIG. 8 shows an example operating environment 800. FIG. 8 is not intended to suggest any limitation as to the scope of use or functionality of operating environment architecture. Neither should the operating environment be interpreted as having any dependency or requirement relating to any one or combination of components shown in the example operating environment.

The disclosure described herein may be operational with numerous other general purpose or special purpose computing system environments or configurations. Computing systems, environments, and/or configurations that may be suitable for use with the systems and methods comprise, but are not limited to, personal computers, server computers, laptop devices, and multiprocessor systems. A computing system may comprise set top boxes, programmable consumer electronics, network PCs, minicomputers, mainframe computers, distributed computing environments that comprise any of the above systems or devices, and the like.

The processing described herein may be performed by software components. The present disclosure may be described in the general context of computer-executable instructions, such as program modules, being executed by one or more computers or other devices. Generally, program modules comprise computer code, routines, programs, objects, components, data structures, etc. that performs particular tasks or implements particular abstract data types. The present disclosure may be practiced in grid-based and distributed computing environments where tasks may be performed by remote processing devices that are linked through a communications network. In a distributed computing environment, program modules may be located in both local and remote computer storage media including memory storage devices.

The present disclosure may be implemented via a general-purpose computing device in the form of a computing device 801. The call management device 100 of FIG. 1 may comprise one or more computing devices 801. The methods of FIGS. 5-7 may be performed by one or more computing devices 801. The components of the computing device 801 may comprise, but are not limited to, one or more processors or processing units 803, a system memory 812, and a system bus 813 that couples various system components including the processor 803 to the system memory 812. In the case of multiple processing units 803, the system may utilize parallel computing.

The system bus 813 represents one or more of several possible types of bus structures, including a memory bus or memory controller, a peripheral bus, an accelerated graphics port, and a processor or a local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB), and/or the like. The bus 813, and all buses specified in this description may be implemented over a wired or wireless network connection and each of the subsystems, including the processor 803, a mass storage device 804, an operating system 805, proactive call management software 806, proactive call management data 807, a network adapter 808, system memory 812, an Input/Output Interface 810, a display adapter 809, a display device 811, and a human machine interface 802, may be contained within one or more remote computing devices 814a,b,c at physically separate locations, connected through buses of this form, in effect implementing a fully distributed system.

The computing device 801 typically comprises a variety of computer readable media. Example readable media may be any available media that is accessible by the computing device 801 and may comprise both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as proactive call management data 807 and/or program modules such as operating system 805 and proactive call management software 806 that are immediately accessible to and/or are presently operated on by the processing unit 803.

The computing device 801 may comprise other removable/non-removable, volatile/non-volatile computer storage media. By way of example, FIG. 8 shows a mass storage device 804 which may provide non-volatile storage of computer code, computer readable instructions, data structures, program modules, and other data for the computing device 801. A mass storage device 804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 804, including by way of example, an operating system 805 and the proactive call management software 806. Each of the operating system 805 and the proactive call management software 806 (or some combination thereof) may comprise elements of the programming and the proactive call management software 806. The proactive call management data 807 may be stored on the mass storage device 804. The proactive call management data 807 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

A user may enter commands and information into the computing device 801 via an input device (not shown). Examples of such input devices may comprise, but are not limited to, a keyboard, a pointing device (e.g., a "mouse"), a microphone, a joystick, a scanner, tactile input devices such as gloves, and other body coverings, and the like. These and other input devices may be connected to the processing unit 803 via the human machine interface 802 that is coupled to the system bus 813, but may be connected by other interface and bus structures, such as a parallel port, game port, an IEEE 1394 Port (also known as a Firewire port), a serial port, or a universal serial bus (USB).

The display device 811 may be connected to the system bus 813 via an interface, such as the display adapter 809. It is contemplated that the computing device 801 may have more than one display adapter 809 and the computer 801 may have more than one display device 811. A display device may comprise a monitor, an LCD (Liquid Crystal Display), or a projector. The display device 811 and/or other output peripheral devices may comprise components such as speakers (not shown) and a printer (not shown) which may be connected to the computing device 801 via the Input/Output Interface 810. Any step and/or result of the methods may be output in any form to an output device. Such output may comprise any form of visual representation, including, but not limited to, textual, graphical, animation, audio, tactile, and the like. The display device 811 and computing device 801 may comprise part of one device, or separate devices.

The computing device 801 may operate in a networked environment using logical connections to one or more remote computing devices 814*a,b,c*. By way of example, a remote computing device may comprise a personal computer, portable computer, a smart phone, a server, a router, a network computer, a peer device or other common network node. Logical connections between the computing device 801 and a remote computing device 814*a,b,c* may be made via a network 815, such as a local area network (LAN) and a general wide area network (WAN). Such network connections may be through the network adapter 808. The network adapter 808 may be implemented in both wired and wireless environments. Such networking environments are conventional and commonplace in dwellings, offices, enterprise-wide computer networks, intranets, and the Internet.

For purposes of explanation, application programs and other executable program components such as the operating system 805 are shown herein as discrete blocks, although such programs and components may reside at various times in different storage components of the computing device 801, and may be executed by the data processor(s) of the computer. An implementation of the proactive call management software 806 may be stored on or sent across some form of computer readable media. Any of the disclosed methods may be performed by computer readable instructions embodied on computer readable media. Computer readable media may comprise any available media that may be accessed by a computer. By way of example and not limitation, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:

1. A method comprising:
   determining at least a portion of a network topology associated with a first service;
   determining, based on the at least the portion of the network topology and network information associated with the first service, a handoff parameter associated with a second service; and
   causing, based on at least the handoff parameter, a handoff of a user device from a first network device to a second network device, wherein the first network device and the second network device are associated with the second service.

2. The method of claim 1, wherein the network topology is associated with at least one of: a hybrid fiber-coax network, a wireless network, or a converged network comprising physically connected devices and wirelessly connected devices.

3. The method of claim 1, wherein the determining the at least the portion of the network topology is based on one or more neighbor lists.

4. The method of claim 1, wherein the network information comprises Data Over Cable Service Interface Specification (DOCSIS) telemetry information, and wherein determining the handoff parameter comprises determining, based on the DOCSIS telemetry information, the handoff parameter.

5. The method of claim 1, wherein the network information comprises at least one of: network capacity information, error detection information, network utilization information, or network latency information.

6. The method of claim 1, wherein the first network device or the second network device is a physically-connected device and the other is a wirelessly-connected device.

7. The method of claim 1, wherein the first service comprises at least one of: a wired data service, a cable network service, a content service, or a Data Over Cable Service Interface Specification (DOCSIS) based service, and wherein the second service comprises at least one of: a wireless data service, a wireless telecommunications service, or a mobile device service.

8. The method of claim 1, wherein the network information associated with the first service comprises at least one of: network telemetry information, reliability information, maintenance information, physical layer condition information, or link layer condition information.

9. The method of claim 1, wherein one or more of the first network device or the second network device comprises at least one of: a wireless access point, a cellular access point, a 4G access point, a 5G access point, a Wi-Fi access point, or an access point configured to facilitate one or more of the first service or the second service.

10. The method of claim 1, wherein the network topology comprises at least one of: a wireless access point, a Wi-Fi access point located at a customer premises, a Wi-Fi access point located at a hotspot location, a cellular tower, a 5G access point, a 4G access point, a radio head, a 5G radio head, an optical node, an optical amplifier, an optical receiver, a headend of a cable modem termination system, a physical network link, a switch, a router, a multiplexer, a splitter, a modem, or a gateway device.

11. The method of claim 1, wherein the at least the portion of the network topology comprises at least one of: a device in the network topology, a group of devices in the network topology, a topology location, a topology region, a topology level, a topology hierarchy, a network hop, a network distance from a network location, or a network link.

12. A method comprising:
    determining at least a portion of a network topology associated with a first service;
    determining, based on the at least the portion of the network topology, network performance information associated with the first service;
    determining, based on the network performance information, a handoff parameter associated with a second service; and
    causing, based on at least the handoff parameter, a handoff of a user device from a first network device to a second network device, wherein the first network device and second network device are associated with the second service.

13. The method of claim 12, wherein determining the handoff parameter is based on the portion of the network topology.

14. The method of claim 12, wherein the network topology is associated with at least one of a hybrid fiber-coax network, a wireless network, or a converged network comprising physically connected devices and wirelessly connected devices.

15. The method of claim 12, wherein the determining the at least the portion of the network topology is based on one or more neighbor lists.

16. The method of claim 12, wherein the network performance information comprises at least one of: Data Over Cable Service Interface Specification (DOCSIS) telemetry information, error detection information, or fault localization information.

17. The method of claim 12, wherein the first network device or the second network device is a physically-connected device and the other is a wirelessly-connected device.

18. A method comprising:
   receiving network performance information associated with a portion of a network topology and a first service;
   determining, based on the network performance information, a handoff parameter associated with a second service; and
   causing, based on at least the handoff parameter, a handoff of a user device from a first network device to a second network device, wherein the first network device and the second network device are associated with the second service.

19. The method of claim 18, wherein the network topology is associated with at least one of: a hybrid fiber-coax network, a wireless network, or a converged network comprising physically connected device and wirelessly connected devices.

20. The method of claim 18, wherein the network performance information comprises at least one of: Data Over Cable Service Interface Specification (DOCSIS) telemetry information, error detection information, or fault localization information.

21. The method of claim 18, wherein the first network device or the second network device is a physically-connected device and the other is a wirelessly-connected device.

* * * * *